C. W. Griffith,
Scroll Sawing Machine,
Nº 30,475.        Patented Oct. 23, 1860.
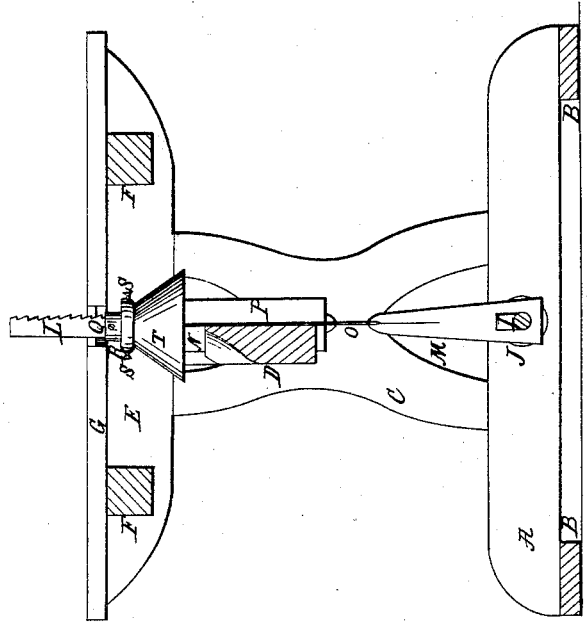
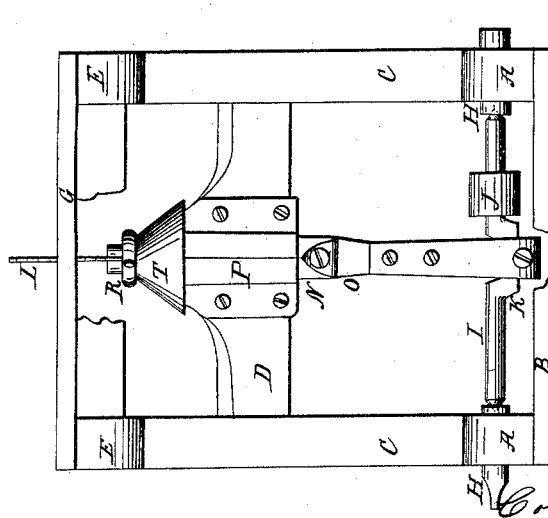
Witnesses:
J. E. Dennis
J. C. Smith
Inventor:
Collins W. Griffith
By his Atty
J. Dennis Jr.

UNITED STATES PATENT OFFICE.

COLLINS W. GRIFFITH, OF DAYTON, OHIO.

DEVICE FOR ADJUSTING THE RAKE OF MULEY SAWS.

Specification of Letters Patent No. 30,475, dated October 23, 1860.

*To all whom it may concern:*

Be it known that I, COLLINS W. GRIFFITH, of Dayton, in the county of Montgomery and State of Ohio, have invented certain new and useful Improvements in Saws for Sawing Scrolls, &c., and I do hereby declare that the same is described and represented in the following specifications and drawings.

To enable others skilled in the art to make and use my invention I will proceed to describe its construction and operation referring to the drawings in which the same letters indicate like parts in each of the figures.

Figure 1, is a front elevation of my improved scroll saw. Fig. 2, is a section of Fig. 1 cut perpendicularly.

The nature of my invention and improvement in scroll saws consists in fastening the saw to the stock in such a manner that it may be readily adjusted, so as to cut more or less at a stroke, and so that it will work without a guide or sash and without being strained. Also in filing the teeth of the saw so that they will cut when the saw is drawn down through the bench, and only when it is so drawn down. And in a hood around the saw stock to shed the saw dust from the support of the stock.

In the accompanying drawings A, A, are the side sills resting on the bars B, B, to which they are fastened to form the base of the frame.

C, C, are standards fastened in to the sills A, A, which standards are connected by the bar D, as shown in the drawing.

E, E, are rails fastened to the tops of the standards C, C, which rails are connected by the bars F, F, which support the planking or top G, of the bench, upon which the material to be sawed is placed and moved against the saw.

The sills A, A, are perforated for the boxes H, H, in which the journals of the crank shaft I, turn, which shaft is provided with a pulley J, for the band to turn the crank K, and traverse the saw L. The pitman M, is connected to the saw stock N, by a flexible piece of plate or sheet metal O, made so thin as to bend easily and last a long time. The saw stock N, traverses in a score in the bar D, and is held against the bar by the scored cap P, which allows it to traverse freely. The upper end of the stock N, is scored to receive the end of the saw and it is perforated at a right angle to the plane of the score, and the screw Q, is put through the end of the saw and screws into the stock, so as to close the sides of the score against the saw L.

The collar R, is fitted to the top of the stock N, and is provided with two set screws S, S, which act against the end of the saw below the screw Q, to set it, so as to incline the saw and make it cut the required distance at each stroke as it is drawn down by the crank.

T, is a hood applied to the stock N, below the collar R, to shed the saw dust away from the box in which the stock traverses.

With my improvements a scroll saw is made far more simple in its construction, and far cheaper; besides it is far less liable to get out of order in use, and it may be run much quicker, than the saws that are either strained or run in a guide. Another very important advantage is in fancy sawing, where the saw has to begin or start in a hole, the piece with the hole in it can be placed right down around the saw, and when sawed taken up again without stopping or unhitching the saw, to put it through the hole where it is to work; hence the piece with several holes in it can be applied to the saw with the greatest facility while the saw is running and without stopping the saw to make the changes.

I believe I have described and represented my improvements in scroll saws so as to enable any person skilled in the art to make and use them. I will now state what I desire to secure by Letters Patent.

I claim—

Fastening one end of the saw to the stock substantially in the manner described, so that it may be adjusted to give it the desired rake or cut.

COLLINS W. GRIFFITH.

Witnesses:
 GEO. OWEN,
 EZRA JEFFERYS.